Oct. 6, 1964

CHARLOTTE TOMATIS
NEE FRANCO
INDICATOR MEANS FOR SPECTROMETERS 3,152,208

Filed May 23, 1960

Inventor:
Charlotte Tomatis, nee Franco
By Baldwin & Wight
Attorneys

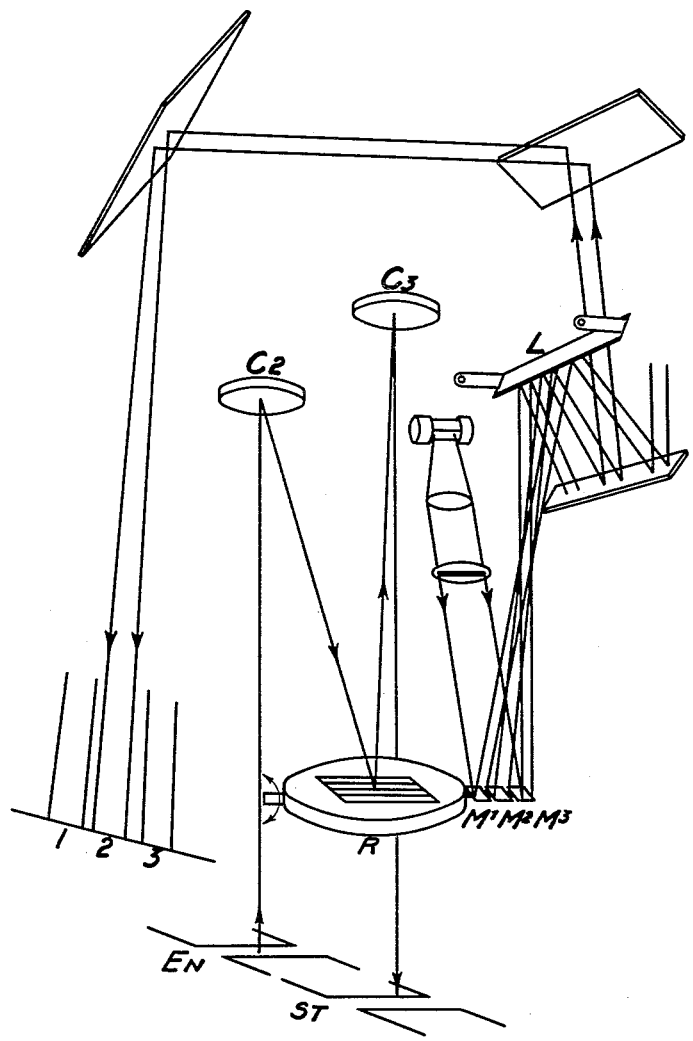

United States Patent Office 3,152,208
Patented Oct. 6, 1964

3,152,208
INDICATOR MEANS FOR SPECTROMETERS
Charlotte Tomatis, nee Franco, Monte Carlo, Monaco, assignor to Societe dite: S.A.F.A.S. Societe Anonyme de Fabrication d'Appareils Scientifiques, Monaco, a corporation of France
Filed May 23, 1960, Ser. No. 30,895
Claims priority, application Monaco, May 22, 1959, 154
5 Claims. (Cl. 88—14)

The present invention concerns improvements applicable to instruments used for the spectral analysis of light radiations.

These instruments all have the common characteristic of including a device for the dispersion of visible or invisible light (ultra-violet, visible or infra-red) and means for selectively isolating a fraction of the radiation emitted by an adequate luminous source in order to study its composition or for making measurements of absorption, reflection, diffusion or re-emission (fluorescence, phosphorescence, luminescence).

This device is generally supplemented by a photometric device, comprised of one or several appropriate receivers and instruments for the absolute or relative, qualitative or quantitative measurements of the isolated band of radiations, the nature of which receivers may differ according to the type of the instrument. In spectrophotometers, the measurements are made with the aid of visual photometers or with photo-electric cells. Spectographs are distinguished by the use of a photographic plate for providing a qualitative or quantitative indication of the received radiation. Spectrometers are instruments of a similar type, more especially adapted for the accurate measurement of emission spectra. As to spectroscopes, these are limited to qualitative examination of spectra. A limiting definition of each type of device is not possible and the improvements forming the subject of the present invention can be applied in whole or in part to all the above and related types of devices and instruments serving for spectral analysis.

In order to describe this invention, it is expedient first to give a brief description of a conventional spectrophotometer to which said improvements are applicable. In FIGURE 1, a plan of such an instrument is schematically given. A source of light $S_c$ illuminates, via plane mirror P and concave mirror $C_1$, the entrance slit $E_N$ of a grating monochromator.

Concave mirror $C_2$ converts the conical beam issuing from $E_N$ into a cylindrical beam which is projected onto a plane diffraction grating R. The grating disperses and reflects a radiation spectrum onto a third concave mirror $C_3$ which focusses it in the plane of the exit slit $S_T$.

By rotation of grating R, as will be explained later, different radiations of the spectra can be made to fall on the slit $S_T$ and thence to leave the monochromator as a straight beam of radiation of a very narrow band of wave-lengths, the transmitted band. The width of the transmitted band, that is to say the difference between the extreme wave-lengths limiting the band at each side, depends on:

(1) The characteristics of the grating,
(2) The focal distances of the focussing mirrors,
(3) The width, controllable at will, of the entry and exit slits of the monochromator.

The beam issuing from $S_T$ is received, possibly after having traversed any interposed substance of which the absorption, reflection or diffusion behaviour is being measured, on a receiver T which converts the luminous intensity, directly or after amplification, into an electrical signal measured for example with the aid of a galvanometer $G_L$.

The indicating means in such an instrument comprise:

(1) Means for indicating the widths of the slits $E_N$ and $S_T$ which are simultaneously adjusted to the same separation width;

(2) Means for indicating the angular rotation of the grating including a scale which is usually calibrated in wave-lengths or in frequency of the mean radiation passing through the exit slit;

(3) Means for indicating the luminous intensity of the final beam falling on the receiver, usually as a proportional electrical signal and read as transmittance or optical density on the calibrated scale of a galvanometer.

In known instruments, the slits are adjusted by a mechanical system of cams and levers operated by a micrometer screw which assures simultaneous opening and closing of both slits and rotates an indicator drum calibrated in millimetres and fractions to indicate the width of the slits. This mechanical system, even when well made, presents particular disadvantages. The bending, thermal expansion and unavoidable play between the mechanical parts introduce errors into the measurement of the width of the slits. Further, in known instruments, rotation of the grating is obtained by a worm and worm gear or equivalent device, which mechanically drives a spiral calibrated directly in wave-lengths or in frequencies. For the same mechanical reasons as those affecting the system for adjusting the slits, this device introduces errors into the measurement of the wave-length.

One object of the invention is precisely to avoid these disadvantages by substituting for the conventional mechanical indicating means, optical projection indicating arrangements completely free from the disadvantages mentioned above as inherent in mechanical arrangements.

Another object, made possible by attainment of the foregoing one, is to combine, on a single translucent screen, positioned at a so-called "Measurement Station," placed conveniently in front of the operator of the instrument, part or all of the calibrated scales relating to the measurement of the width of the slits and the wave-length, as well as any other measurement scales, and particularly transmittance or light density readings. In general, in known instruments, the latter device is distinct from the spectrophotometer. It can advantageously be incorporated in this instrument according to the present invention.

Other objects and advantages of the invention will become apparent during the course of the description.

FIGURE 4 is a schematic view of another light system embodying another form of the invention.

Figure 1:
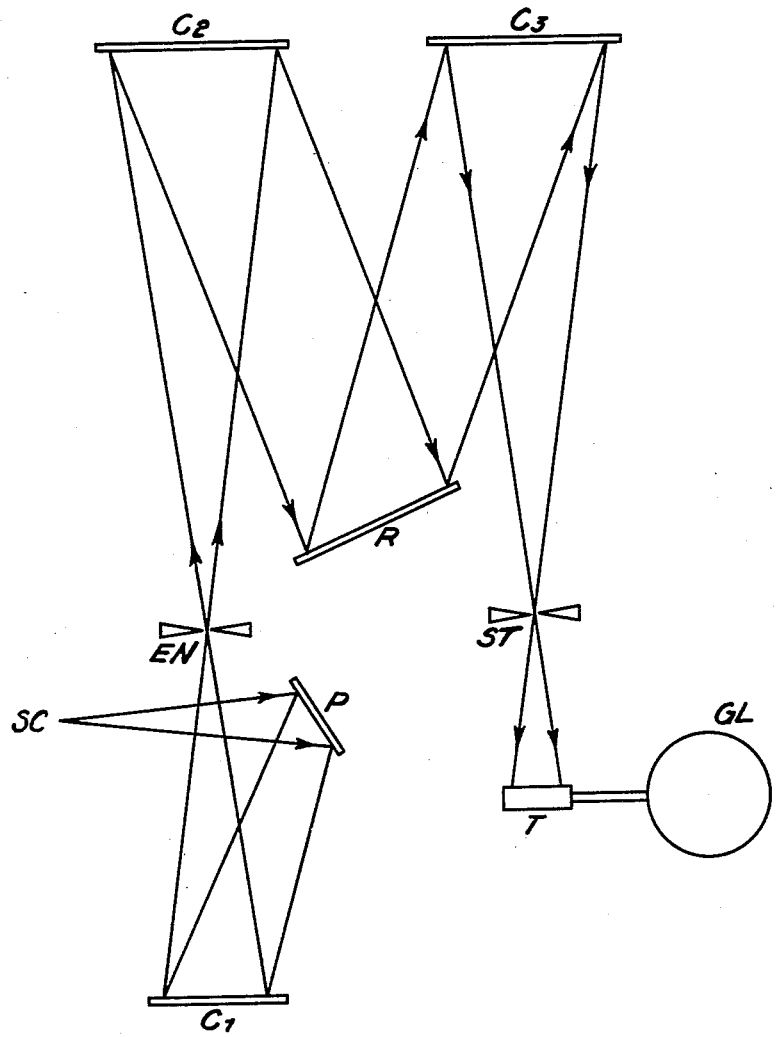
FIGURE 1 is a schematic view of a conventional spectrophotometer.
Figure 3:
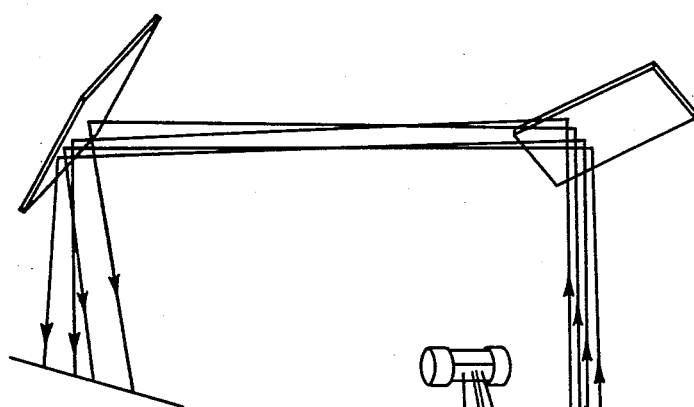
FIGURE 3 is a schematic view of a light system embodying the invention.

By way of example, there will now be described in detail an embodiment of the invention as applied to a spectrophotometer of a general type similar to that described above with reference to FIG. 1. It is clear that this description is not limiting and that the improvements forming the subject of the invention may be applied to all types of instruments used for spectral analysis and comprising components different from those shown which serve equivalent functions; for example, assemblies of one or several slits may be adjustable simultaneously or separately; dioptric optical systems (lenses) may be substituted for the catoptric optical systems (mirrors) shown; concave gratings or gratings associated with transmission systems and refracting prisms may be substituted for the plane diffraction grating and the reflection system shown, etc.

Figure 2:
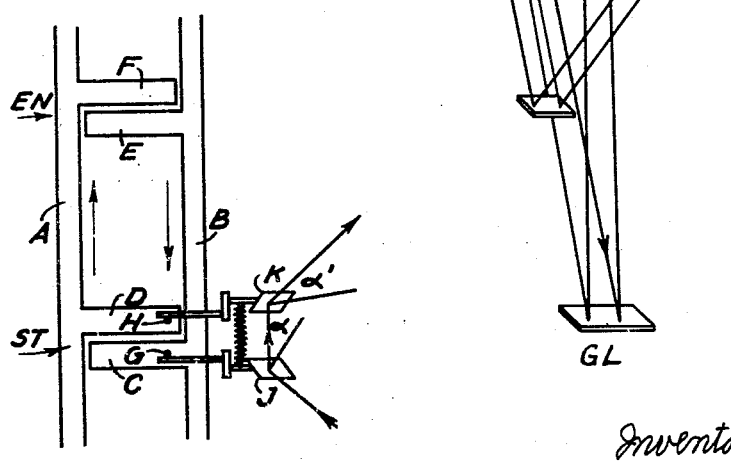
FIGURE 2 is a schematic view of the entrance and exit defining means embodying the invention.

FIGURE 2 represents a schematic plan of the entrance and exit slit means in a direction perpendicular to the light rays. The slit defining means comprise two parts A and B capable of being displaced in opposite directions and simultaneously by an adjusting device comprising levers and cams, not shown, which adjusting device does not, in distinction to the conventional systems, participate in the measuring of the width of the slits. Pairs of projecting portions C and D, and E and F, of the parts A and B, each define therebetween an entrance slit and an exit slit respectively, both of variable width. While the entrance and exit slits in the example are shown as being rectilinear and symmetrical, they might be otherwise shaped and provided in any number as required in the particular optical instrument. The parts C and D each carry at their adjacent ends a cylindrical pin (G and H), fixed perpendicularly to their plane. These pins, during the rectilinear displacements of A and B which effect the opening and closing of the slits, act via small cranks continually held against them by a spring, to rotate a pair of mirrors J and K, the axes of rotation of which are parallel to the plane of the slits and which serve to measure the width of the slits. This converts the generally small relative displacements of the parts C and D into strictly proportional rotations of the mirrors J and K. If a fixed light beam containing an image of a vertical reticle is projected at a convenient angle into the mirror J, as shown in FIGURE 2, the beam will be deviated by an angle $\alpha$ by the rotation of this mirror. The beam then falling on the suitably positioned mirror K will undergo a further deflection $\alpha'$ under the influence of the latter mirror. It will be readily understood that the algebraic sum $\beta = \alpha + \alpha'$ of the angular deviations of the projected beam represents exactly the relative rectilinear displacement of the sides of the slit. By means of a further system of mirrors (not shown), the image of the reticle is projected onto the calibrated scale on the screen of the indicating station. It is to be understood that any suitable mechanical device, other than that shown, for converting the rectilinear movement of the parts A and B into a movement of rotation of the mirrors J and K may be used without departing from the scope of the invention.

The advantages of this device are clearly apparent. The mechanism for measuring the width of the slits is completely independent of the mechanism for adjusting the width of the slits and is not influenced by the mechanical errors in the said mechanism.

The device is simple and can be constructed with precision. The amplification of the movements resulting from the optical projection is considerable; it easily permits the measurements of very small openings (less than one hundredth of a millimetre).

The measurement is accurate because it is differential. In the known systems, the measurement is made with respect to one of the sides of the slit taken as a fixed reference and this cannot be strictly and constantly ensured. On the contrary, in the system of the invention, the angular deviation of the measuring beam exactly represents the separation of the two sides of the slit.

In the example described, the entry slit limited by the sides E and F is symmetrical and equal to the exit slit carrying the measuring device. It is thus unnecessary to attach thereto a second similar device. This restriction is not limiting and it is clear that the system described may be applied to each of the slits of the instrument where it would be necessary to measure the opening of each slit independently.

FIGURE 4 shows a device for measuring the rotation of the grating and hence the mean wave-length passing through the exit slit.

It is easily shown that the wave-length of the radiation received on the axis of the exit slit is dependent on the rotation of the grating according to the formula:

$$n\lambda = a(\sin i \pm \sin r)$$

in which:

$n$ is the order of the spectrum
$\lambda$ is the wave-length
$a$ is the cycle period of the grating
$i$ and $r$ are the angles of incidence and diffraction respectively, measured with respect to a normal to the grating, with the usual convention of signs.

In the optical system described, the sum $i+r$ remains constant. The rotation of the grating about an axis of symmetry contained in its plane and parallel to the direction of the rulings, alters only the relationship of the values $i$ and $r$. It is possible, therefore, for a given position value of the grating with respect to an origin, which may for example be the direction of the axis of the incident beam, to calculate with any desired accuracy the wave-length of the light radiation falling on the axis of the exit slit. The angle of rotation of the grating is given directly in wave-length by an optical projection system forming part of the invention. As shown in FIGURE 4, a system of three small concave mirrors $M_1$, $M_2$, $M_3$ is fixed on an extension of the axis of rotation of the grating R, the angular adjusting mechanism of which is not illustrated. The mirrors have a common axis of rotation which is rigidly connected with that of the grating. By projecting a fixed light beam containing an image of a vertical reticle, wire enough to cover the surface of all the mirrors, there are formed, with suitable relative angular displacements between the planes of the mirrors, three images constituted by the upper, central and lower parts of the initial image of the reticle. Each partial image is received by a system of mirrors and projected onto a screen calibrated in wave-lengths over which it travels on rotation of the grating. The relative positioning of the mirrors is such that, for a rotation of the grating, throughout the full range of the spectrum scannable by the instrument, in the first third of the spectrum the reticle image is projected by the mirror $M_1$ onto the upper scale, in the central part of the spectrum said image is projected by the mirror $M_2$ on to the central scale, and in the final part of the spectrum the image is projected by the mirror $M_3$ onto the lower scale. Thus, there appears on the screen (FIG. 5), at any one time, but a single image of the reticle for the measurement of wave-lengths, and the three scales are traversed successively and without interruption in the course of the rotation of the grating. The object of this device is to spread out the wave-length scales so as to allow more accurate readings.

Further, the number of superposed mirrors and scales may be increased or decreased at will. Adjusting means (not shown) permit individual angular adjustment of each mirror in order to obtain coincidence of a selected radiation received by the exit slit with the proper calibration read on the corresponding scale by means of the projected reticle image. A moveable auxiliary mirror L permits adjustment of the length of the optical path of the projected beams and the pre-setting of he scales.

It is clear that the arrangement described is applicable to light dispersing means other than the diffraction grating shown, such as constant deviation prisms with or without an auxiliary mirror, etc. The advantages of this aspect of the invention are basically the same as in the preceding aspect. The mechanism for measuring the wavelengths in a spectrophotometer is completely independent from the mechanism for effecting the rotation of the dispersive means and is not influenced by any mechanical errors present in the latter. The device is simple and may be constructed with great precision.

The amplification of the movement of the grating is very large. It ensures an easy and accurate reading of the wave-length scales.

The presence of an increased number of index points on the scales permits much higher accuracy in the gauging of the wave-lengths than was possible in conventional instruments, in which the coincidence between the position of a known radiation on the exit slit and the corresponding scale calibration is generally only set at a single index point on the scale.

To avoid bending and relative displacement between the various constructional parts liable to introduce errors in the projection of the luminous beams, the optical part of the instrument is mounted in a rigid sealed casing around which the reflecting mirrors and the screen of the indication station are mounted. This assembly may be suspended, in an elastic manner, within the instrument cabinet, in order to avoid the transmission of deformations through the frame of the instrument when the latter is placed on a support (table or desk), the horizontality of which is not generally assured. Additionally the sealing of the optical casing is desirable to permit its being filled with a suitable gas, e.g. for measurements in certain regions of the ultra-violet spectrum where the absorption characteristics of atmospheric air would be objectionably high.

Figure 5:
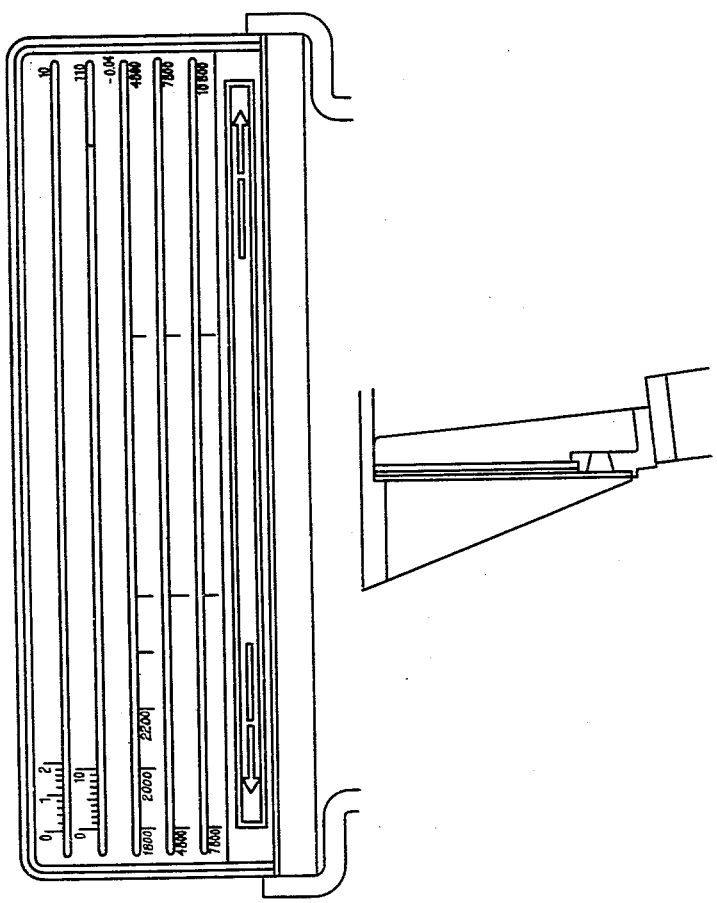
FIGURE 5 is a front elevational view of the screen showing various scales.

FIGURE 5 shows an example of the screen of the indicating station, grouping together the different measurement scales of the optical projection systems of the invention.

Scale No. 1 is for the measurement of the width of the slits and is calibrated in hundredths of a millimetre.

Scale No. 2 indicates variations in a galvanometer output current and is calibrated in transmission and in the corresponding optical density values.

Scale No. 3 displays the first part of the spectrum from 1800 to 4800 Angstrom units.

Scale No. 4 displays the second part of the spectrum from 4800 to 7800 Angstrom units.

Scale No. 5 displays the terminal part of the spectrum from 7800 to 10,800 Angstrom units.

Scale No. 6 is for the various luminous indicators, in particular for the arrows indicating the direction of the displacement of the spectrum in the course of the rotation of the grating.

The number of scales is not limited and can be increased or decreased in accordance with the number of different measurements the instrument is constructed to provide.

The operator of the instrument is enabled to observe simultaneously all the measurements, whereas in all existing devices such measurement displays are dispersed at different points on the instrument. The grouping together of all the information at a common indicating station, avoiding unnecessary movements of the operator, constitutes one of the advantages of the invention.

What I claim is:

1. In apparatus for the spectral analysis of light radiations having means defining an entrance slit, means defining an exit slit, said entrance and exit slit defining means comprising a pair of relatively slidable members having cooperating pairs of surfaces respectively defining said entrance and exit slits therebetween, optical means defining a light path passing from a light source thence through the entrance slit and through the exit slit, light dispersing means interposed in the path ahead of said exit slit for dispersing the light to provide a spectrum, first mechanical adjusting means connected with said dispersing means for adjusting the position thereof in said path so as to direct a selected region of the spectrum through said exit slit, and second mechanical adjusting means connected with said pair of relatively slidable members for adjusting slit width; mirror means comprising a pair of mirrors, means mounting the mirrors for angular displacement about spaced axes, means mechanically connecting each of said members with a related mirror for relative angular displacement of said mirrors in response to relative sliding of the members, optical means for projecting a beam of light onto said mirrors, and a screen having a scale calibrated in slit widths, said screen being positioned to receive reflections from said mirrors upon said scale, whereby the widths of the slits are indicated independently of the operation of the second mechanical adjusting means.

2. Apparatus as claimed in claim 1 further including the provision of a plurality of mirrors supported for rotation with said dispersing means, each mirror of said plurality being angularly displaced with respect to the others by successive angular increments, means projecting a light beam onto all of said plurality of mirrors, and a plurality of screens positioned to receive the partial images of said beam as reflected by the respective mirrors and whereby, on continuous rotation of said dispersing means throughout its angular range, a single image appears to traverse each of said plurality of screens in succession to provide an indication of the adjusted output wavelength.

3. Apparatus as claimed in claim 2, wherein said screens are calibrated in units of wave-length, and said calibration units of the respective screens are substantially continuous with one another.

4. Apparatus as claimed in claim 2, wherein there are three mirrors and three associated screens.

5. Apparatus for the spectral analysis of light radiations comprising a first light source, means including relatively slidable members for defining an entrance slit and an exit slit, optical means defining a light path passing from said first light source through the entrance slit and thence through the exit slit, light dispersing means interposed in the light path ahead of said exit slit for dispersing the light to provide a spectrum, first mechanical adjusting means connected with said light dispersing means for adjusting the position thereof in said light path so as to direct a selected region of the spectrum through said exit slit, photosensitive receiving means positioned in said light path beyond the exit slit and responsive to light energy passed by said exit slit, an optical indicating arrangement including a second light source and means for varying the position of a light beam from said second source in response to the light energy received by said receiving means, an indicator screen positioned at an indicating station, said indicator screen having a first scale, calibrated in units of light energy, positioned to receive the light beam from said second source, a plurality of mirrors mounted for rotation with said light dispersing means, each mirror of said plurality being angularly displaced with respect to the others by successive angular increments, a third light source, means for directing a light beam from said third source onto all of said mirrors, said indicator screen having a plurality of cooperating scales positioned to receive partial images of the beam from said third light source as reflected by the respective mirrors to provide an indication at the indicating station of the adjusted output wavelength being selected, second mechanical adjusting means connected with said relatively slidable members for adjusting the widths of said slits, and optical indicating means for measuring the widths of said slits, said optical indicating means including a further plurality of mirrors, means mounting the latter mirrors for angular displacement about spaced axes, means mechanically connecting each of said members with a corresponding one of the latter mirrors for relative angular displacement thereof in response to relative sliding of the members, a fourth light source, and means for directing further light beams from said fourth source onto said further mirrors in pairs, said indicator screen also having further scales, calibrated in slit widths, positioned to receive the images of said further beams as reflected by said further mirrors, whereby the widths of the slits are measured independently of the operation of the second mechanical adjusting means at the same indicating station.

References Cited in the file of this patent

UNITED STATES PATENTS

| | | |
|---|---|---|
| 2,143,011 | De Juhasz | Jan. 10, 1939 |
| 2,224,281 | Webber | Dec. 10, 1940 |
| 2,239,075 | Biedermann | Apr. 22, 1941 |
| 2,288,243 | Hyde | June 30, 1942 |
| 2,307,950 | Plaut et al. | Jan. 12, 1943 |
| 2,320,380 | Okolicsanyi et al. | June 1, 1943 |
| 2,347,702 | Maris | Mar. 2, 1944 |
| 2,497,345 | Clay et al. | Feb. 14, 1950 |
| 2,569,579 | Rinker | Oct. 2, 1951 |
| 2,664,024 | Hansen | Dec. 29, 1953 |
| 2,676,515 | Diehl | Apr. 27, 1954 |
| 2,746,352 | Estey | May 22, 1956 |

FOREIGN PATENTS

| | | |
|---|---|---|
| 206,849 | Germany | Feb. 11, 1909 |
| 553,988 | Great Britain | June 15, 1943 |